(12) United States Patent
Barker et al.

(10) Patent No.: US 7,629,705 B2
(45) Date of Patent: Dec. 8, 2009

(54) METHOD AND APPARATUS FOR OPERATING ELECTRICAL MACHINES

(75) Inventors: Sidney A. Barker, Troutville, VA (US); Anthony Klodowski, Hardy, VA (US); John D'Atre, Vancouver, WA (US); Einar Larsen, Charlton, NY (US); Goran Drobnjak, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 351 days.

(21) Appl. No.: 11/551,430

(22) Filed: Oct. 20, 2006

(65) Prior Publication Data
US 2008/0093853 A1   Apr. 24, 2008

(51) Int. Cl.
*H02P 11/00* (2006.01)
*H02P 9/00* (2006.01)
*H02P 9/04* (2006.01)

(52) U.S. Cl. .............................. 290/55; 322/24; 322/28

(58) Field of Classification Search .................. 322/24, 322/28, 44; 290/44, 55
See application file for complete search history.

(56) References Cited

U.S. PATENT DOCUMENTS

| | | | | |
|---|---|---|---|---|
| 5,239,251 A | * | 8/1993 | Lauw | .......................... 318/767 |
| 6,583,521 B1 | * | 6/2003 | Lagod et al. | ................... 307/70 |
| 6,693,409 B2 | | 2/2004 | Lynch et al. | |
| 6,850,426 B2 | | 2/2005 | Kojori et al. | |
| 2004/0145188 A1 | * | 7/2004 | Janssen et al. | ................. 290/44 |
| 2004/0145357 A1 | | 7/2004 | Lynch et al. | |
| 2006/0002157 A1 | | 1/2006 | Petter et al. | |
| 2007/0132248 A1 | * | 6/2007 | Weng et al. | .................... 290/44 |
| 2007/0290506 A1 | * | 12/2007 | Walling | ........................ 290/44 |
| 2008/0238215 A1 | * | 10/2008 | Ye et al. | ...................... 307/127 |

* cited by examiner

*Primary Examiner*—Julio C. Gonzalez
(74) *Attorney, Agent, or Firm*—James McGinness, Esq.; Armstrong Teasdale LLP (57) ABSTRACT

A method for operating an electrical machine includes coupling the electrical machine to an electric power system such that the electric power system is configured to transmit at least one phase of electric power to and from the electrical machine. The method also includes configuring the electrical machine such that the electrical machine remains electrically connected to the electric power system during and subsequent to a voltage amplitude of the electric power system operating outside of a predetermined range for an undetermined period of time.

17 Claims, 5 Drawing Sheets

| 602 | 604 | 606 | 608 | 610 |
|---|---|---|---|---|
| 0 | A | C | E | E |
| 1 | A | C | F | H |
| 2 | B | D | G | I |
| 3 | A | C | E | E |

METHOD AND APPARATUS FOR OPERATING ELECTRICAL MACHINES

BACKGROUND OF THE INVENTION

This invention relates generally to electrical machines and more particularly, to methods and apparatus for operating electrical machines.

Generally, a wind turbine generator includes a turbine that has a rotor that includes a rotatable hub assembly having multiple blades. The blades transform mechanical wind energy into a mechanical rotational torque that drives one or more generators via the rotor. The generators are generally, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbine generators also exist. The rotor, generator, gearbox and other components are typically mounted within a housing, or nacelle, that is positioned on top of a base that may be a truss or tubular tower.

Some gearless direct drive wind turbine generator configurations include doubly fed induction generators (DFIGs). Such configurations may also include power converters that are used to transmit generator excitation power to a wound generator rotor from one of the connections to the electric utility grid connection. Under certain circumstances, grid voltage fluctuations may be experienced that may include low voltage transients with voltage fluctuations that approach zero volts. Generally, the power converters and the generator are susceptible to grid voltage fluctuations. Therefore, such grid voltage fluctuations may be deleterious to continuous operation of the wind turbine generator.

BRIEF DESCRIPTION OF THE INVENTION

In one aspect, a method for operating an electrical machine is provided. The method includes coupling the electrical machine to an electric power system such that the electric power system is configured to transmit at least one phase of electric power to and from the electrical machine. The method also includes configuring the electrical machine such that the electrical machine remains electrically connected to the electric power system during and subsequent to a voltage amplitude of the electric power system operating outside of a predetermined range for an undetermined period of time.

In another aspect, a control system for an electrical machine is provided. The electrical machine is configured to be electrically coupled to an electric power system. The electric power system is configured to transmit at least one phase of electric power to and from the electrical machine. The control system facilitates the electrical machine remaining electrically connected to the electric power system during and subsequent to at least one voltage amplitude of the electric power operating outside of a predetermined range for an undetermined period of time.

In a further aspect, a wind turbine is provided. The wind turbine includes at least one electric power generator configured to be electrically coupled to an electric power system. The electric power system is configured to transmit at least one phase of electric power to and from the generator. The wind turbine also includes at least one control system configured to be electrically coupled to the electric power system. The control system facilitates the electrical machine remaining electrically connected to the electric power system during and subsequent to at least one voltage amplitude of the electric power operating outside of a predetermined range for an undetermined period of time.

DETAILED DESCRIPTION OF THE INVENTION

Figure 1:
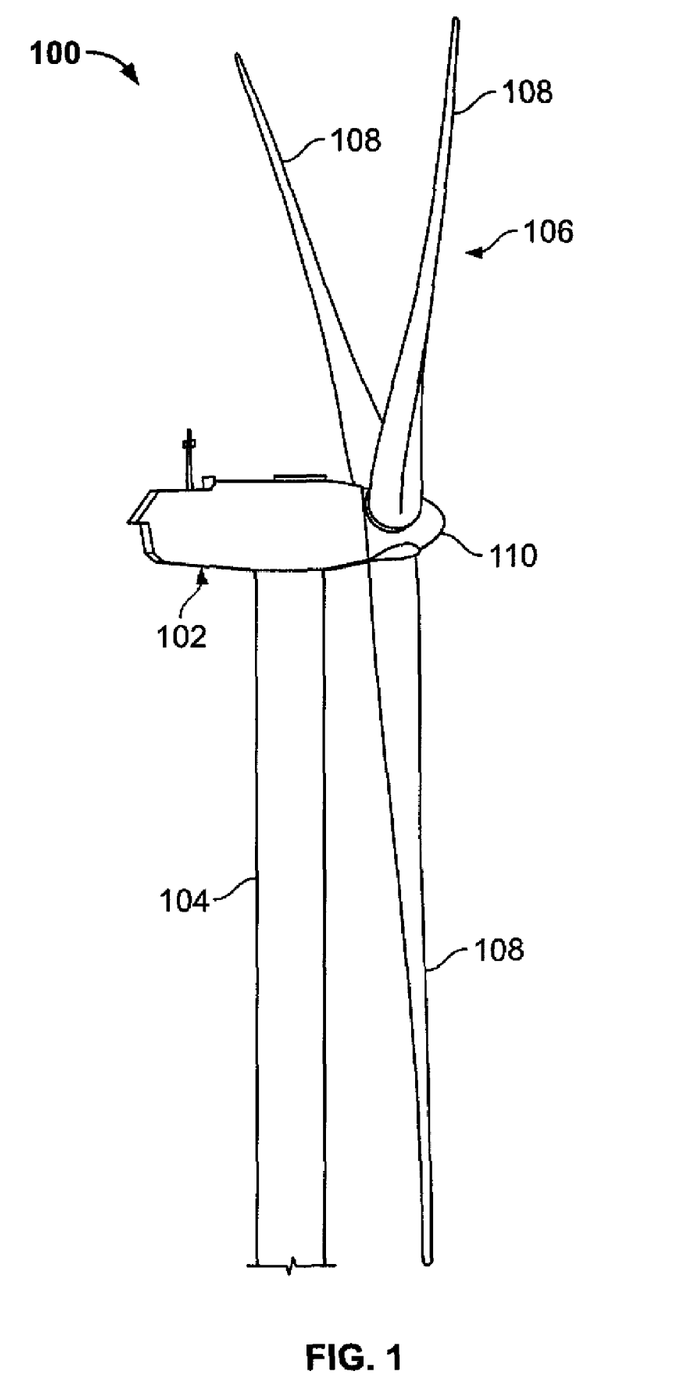
FIG. 1 is a schematic view of an exemplary wind turbine generator.

FIG. 1 is a schematic view of an exemplary wind turbine generator 100. The wind turbine 100 includes a nacelle 102 housing a generator (not shown in FIG. 1). Nacelle 102 is mounted on a tower 104 (a portion of tower 104 being shown in FIG. 1). Tower 104 may be any height that facilitates operation of wind turbine 100 as described herein. Wind turbine 100 also includes a rotor 106 that includes three rotor blades 108 attached to a rotating hub 110. Alternatively, wind turbine 100 includes any number of blades 108 that facilitate operation of wind turbine 100 as described herein. In the exemplary embodiment, wind turbine 100 wind turbine 100 includes a gearbox (not shown in FIG. 1) rotatingly coupled to rotor 106 and a generator (not shown in FIG. 1).

Figure 2:
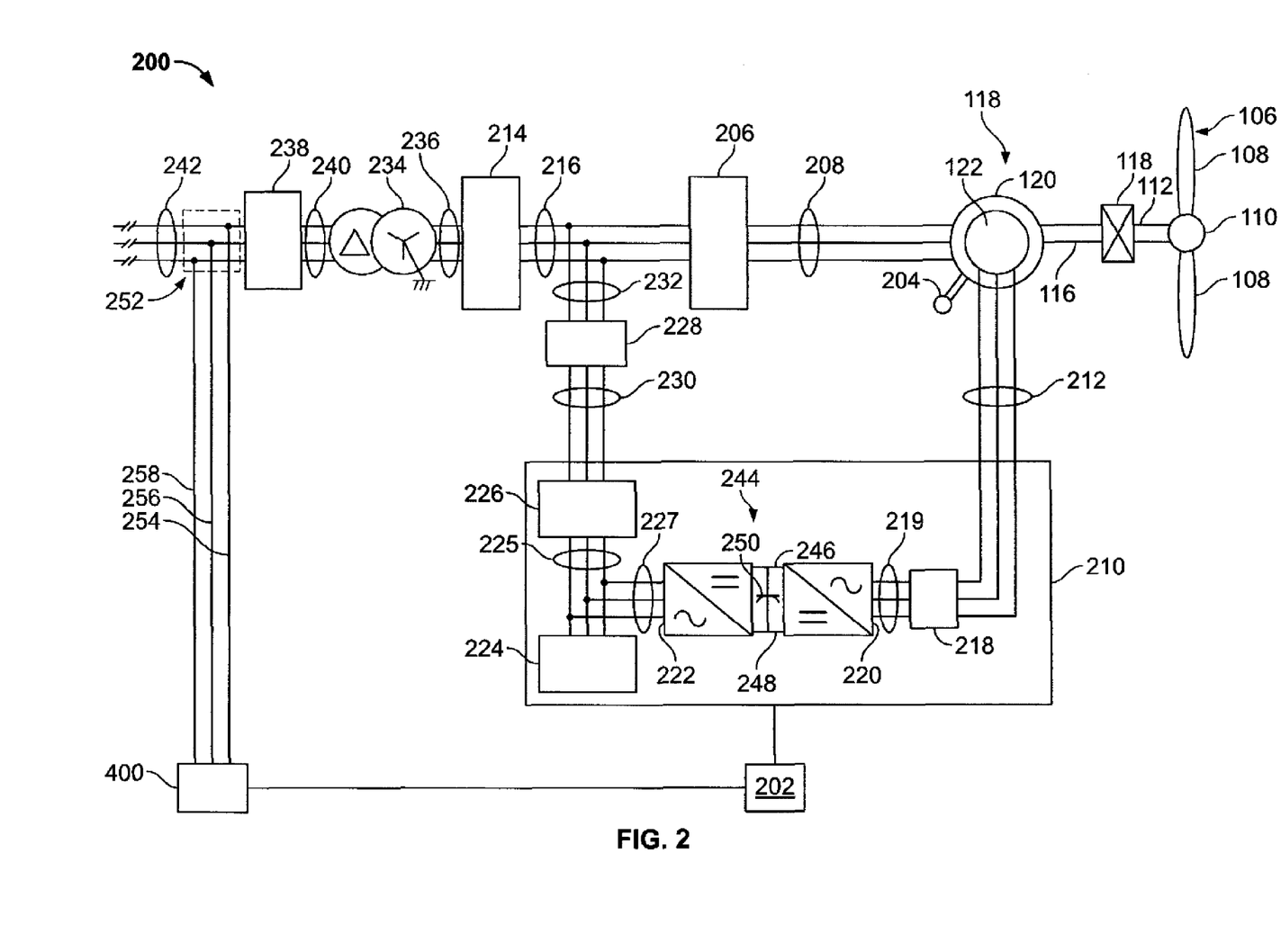
FIG. 2 is a schematic view of an exemplary electrical and control system that may be used with the wind turbine generator shown in FIG. 1.

FIG. 2 is a schematic view of an exemplary electrical and control system 200 that may be used with wind turbine generator 100 (shown in FIG. 1). Rotor 106 includes plurality of rotor blades 108 coupled to rotating hub 110. Rotor 106 also includes a low-speed shaft 112 rotatably coupled to hub 110. Low-speed shaft is coupled to a step-up gearbox 114. Gearbox 114 is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (20) coupled to gearbox 114 with an approximately 70:1 step-up ratio generates a high-speed shaft 116 speed of approximately 1400 rpm. Alternatively, gearbox 114 has any step-up ratio that facilitates operation of wind turbine 100 as described herein. Also, alternatively, wind turbine 100 includes a direct-drive generator wherein a generator rotor (not shown in FIG. 1) is rotatingly coupled to rotor 106 without any intervening gearbox.

High-speed shaft 116 is rotatably coupled to generator 118. In the exemplary embodiment, generator 118 is a wound rotor, synchronous, 60 Hz, three-phase, doubly-fed induction generator (DFIG) that includes a generator stator 120 magnetically coupled to a generator rotor 122. Alternatively, generator 118 is any generator that facilitates operation of wind turbine 100 as described herein.

Electrical and control system 200 includes a controller 202. Controller 202 includes at least one processor and a memory, at least one processor input channel, at least one processor output channel, and may include at least one computer (none shown in FIG. 2). As used herein, the term computer is not limited to just those integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, a floppy disk, a compact disc—read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but not be limited to, computer peripherals associated with an operator interface such as a mouse and a keyboard (neither shown in FIG. 2). Alternatively, other computer peripherals may also be used that may include, for example, but not be limited to, a scanner (not shown in FIG. 2). Furthermore, in the exemplary embodiment, additional output channels may include, but not be limited to, an operator interface monitor (not shown in FIG. 2).

Processors for controller 202 process information transmitted from a plurality of electrical and electronic devices that may include, but not be limited to, speed and power transducers. RAM and storage device store and transfer information and instructions to be executed by the processor. RAM and storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Electrical and control system 200 also includes generator rotor tachometer 204 that is coupled in electronic data communication with generator 118 and controller 202. Generator stator 120 is electrically coupled to a stator synchronizing switch 206 via a stator bus 208. In the exemplary embodiment, to facilitate the DFIG configuration, generator rotor 122 is electrically coupled to a bi-directional power conversion assembly 210 via a rotor bus 212. Alternatively, system 200 is configured as a full power conversion system (not shown) known in the art, wherein a fill power conversion assembly (not shown) that is similar in design and operation to assembly 210 is electrically coupled to stator 120 and such full power conversion assembly facilitates channeling electrical power between stator 120 and an electric power transmission and distribution grid (not shown). Stator bus 208 transmits three-phase power from stator 120 and rotor bus 212 transmits three-phase power from rotor 122 to assembly 210. Stator synchronizing switch 206 is electrically coupled to a main transformer circuit breaker 214 via a system bus 216.

Assembly 210 includes a rotor filter 218 that is electrically coupled to rotor 122 via rotor bus 212. Rotor filter 218 is electrically coupled to a rotor-side, bi-directional power converter 220 via a rotor filter bus 219. Converter 220 is electrically coupled to a line-side, bi-directional power converter 222. Converters 220 and 222 are substantially identical. Power converter 222 is electrically coupled to a line filter 224 and a line contactor 226 via a line-side power converter bus 223 and a line bus 225. In the exemplary embodiment, converters 220 and 222 are configured in a three-phase, pulse width modulation (PWM) configuration including insulated gate bipolar transistor (IGBT) switching devices (not shown in FIG. 2) that "fire" as is known in the art. Alternatively, converters 220 and 222 have any configuration using any switching devices that facilitate operation of system 200 as described herein. Assembly 210 is coupled in electronic data communication with controller 202 to control the operation of converters 220 and 222.

Line contactor 226 is electrically coupled to a conversion circuit breaker 228 via a conversion circuit breaker bus 230. Circuit breaker 228 is also electrically coupled to system circuit breaker 214 via system bus 216 and connection bus 232. System circuit breaker 214 is electrically coupled to an electric power main transformer 234 via a generator-side bus 236. Main transformer 234 is electrically coupled to a grid circuit breaker 238 via a breaker-side bus 240. Grid breaker 238 is connected to an electric power transmission and distribution grid via a grid bus 242.

In the exemplary embodiment, converters 220 and 222 are coupled in electrical communication with each other via a single direct current (DC) link 244. Alternatively, converters 220 and 222 are electrically coupled via individual and separate DC links (not shown in FIG. 2). DC link 244 includes a positive rail 246, a negative rail 248, and at least one capacitor 250 coupled therebetween. Alternatively, capacitor 250 is one or more capacitors configured in series or in parallel between rails 246 and 248.

System 200 further includes a phase-locked loop (PLL) regulator 400 that is configured to receive a plurality of voltage measurement signals from a plurality of voltage transducers 252. In the exemplary embodiment) each of three voltage transducers 252 are electrically coupled to each one of the three phases of bus 242. Alternatively, voltage transducers 252 are electrically coupled to system bus 216. Also, alternatively, voltage transducers 252 are electrically coupled to any portion of system 200 that facilitates operation of system 200 as described herein. PLL regulator 400 is coupled in electronic data communication with controller 202 and voltage transducers 252 via a plurality of electrical conduits 254, 256, and 258. Alternatively, PLL regulator 400 is configured to receive any number of voltage measurement signals from any number of voltage transducers 252, including, but not limited to, one voltage measurement signal from one voltage transducer 252. PLL regulator 400 is discussed further below.

During operation, wind impacts blades 108 and blades 108 transform mechanical wind energy into a mechanical rotational torque that rotatingly drives low-speed shaft 112 via hub 110. Low-speed shaft 112 drives gearbox 114 that subsequently steps up the low rotational speed of shaft 112 to drive high-speed shaft 116 at an increased rotational speed. High speed shaft 116 rotatingly drives rotor 122. A rotating magnetic field is induced within rotor 122 and a voltage is induced within stator 120 that is magnetically coupled to rotor 122. Generator 118 converts the rotational mechanical energy to a sinusoidal, three-phase alternating current (AC) electrical energy signal in stator 120. The associated electrical power is transmitted to main transformer 234 via bus 208, switch 206, bus 216, breaker 214 and bus 236. Main transformer 234 steps up the voltage amplitude of the electrical power and the transformed electrical power is further transmitted to a grid via bus 240, circuit breaker 238 and bus 242.

In the doubly-fed induction generator configuration, a second electrical power transmission path is provided. Electrical, three-phase, sinusoidal, AC power is generated within wound rotor 122 and is transmitted to assembly 210 via bus 212. Within assembly 210, the electrical power is transmitted to rotor filter 218 wherein the electrical power is modified for the rate of change of the PWM signals associated with converter 220. Converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to power converter 222 wherein converter 222 acts as an inverter configured to convert the DC electrical power from DC link 244 to three-phase, sinusoidal AC electrical power with pre-determined voltages, currents, and frequencies. This conversion is monitored and controlled via controller 202. The converted AC power is transmitted from converter 222 to bus 216 via buses 227 and 225, line contactor 226, bus 230, circuit breaker 228, and bus 232. Line filter 224 compensates or adjusts for harmonic currents in the electric power transmitted from converter 222. Stator synchronizing switch 206 is configured to close such that connecting the three-phase power from stator 120 with the three-phase power from assembly 210 is facilitated.

Circuit breakers 228, 214, and 238 are configured to disconnect corresponding buses, for example, when current flow is excessive and can damage the components of the system 200. Additional protection components are also provided, including line contactor 226, which may be controlled to form a disconnect by opening a switch (not shown in FIG. 2) corresponding to each of the lines of the line bus 230.

Assembly 210 compensates or adjusts the frequency of the three-phase power from rotor 122 for changes, for example, in the wind speed at hub 110 and blades 108. Therefore, in this manner, mechanical and electrical rotor frequencies are decoupled and the electrical stator and rotor frequencies matching is facilitated substantially independently of the mechanical rotor speed.

Under some conditions, the bi-directional characteristics of assembly 210, and specifically, the bi-directional characteristics of converters 220 and 222, facilitate feeding back at least some of the generated electrical power into generator rotor 122. More specifically, electrical power is transmitted from bus 216 to bus 232 and subsequently through circuit breaker 228 and bus 230 into assembly 210. Within assembly 210, the electrical power is transmitted through line contactor 226 and busses 225 and 227 into power converter 222. Converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to power converter 220 wherein converter 220 acts as an inverter configured to convert the DC electrical power transmitted from DC link 244 to a three-phase, sinusoidal AC electrical power with pre-determined voltages, currents, and frequencies. This conversion is monitored and controlled via controller 202. The converted AC power is transmitted from converter 220 to rotor filter 218 via bus 219 is subsequently transmitted to rotor 122 via bus 212. In this manner, generator reactive power control is facilitated.

Assembly 210 is configured to receive control signals from controller 202. The control signals are based on sensed conditions or operating characteristics of wind turbine 100 and system 200 as described herein and used to control the operation of the power conversion assembly 210. For example, tachometer 204 feedback in the form of sensed speed of the generator rotor 122 may be used to control the conversion of the output power from rotor bus 212 to maintain a proper and balanced three-phase power condition. Other feedback from other sensors also may be used by system 200 to control assembly 210 including, for example, stator and rotor bus voltages and current feedbacks. Using this feedback information, and for example, switching control signals, stator synchronizing switch control signals and system circuit breaker control (trip) signals may be generated in any known manner. For example, for a grid voltage transient with predetermined characteristics, controller 202 will at least temporarily substantially suspend firing of the IGBTs within converter 222. Such suspension of operation of converter 222 will substantially mitigate electric power being channeled through conversion assembly 210 to approximately zero.

Figure 3:
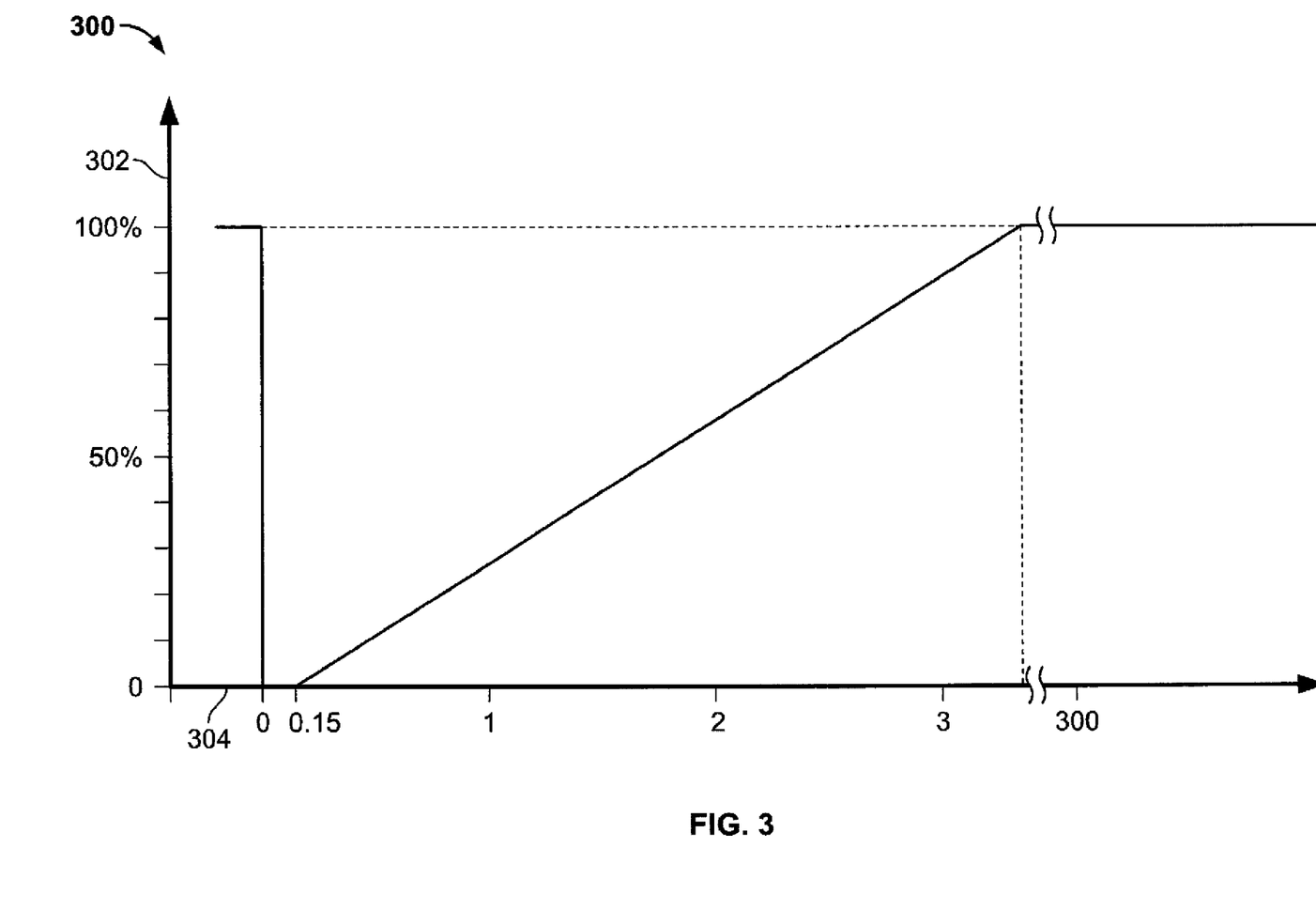
FIG. 3 is a graphical view of grid line voltage versus time that may be associated with the electrical and control system shown in FIG. 2.

FIG. 3 is a graphical view of grid line voltage versus time 300 that may be associated with electrical and control system 200 (shown in FIG. 2). Graph 300 includes an ordinate (y-axis) 302 that represents grid line voltage in units of percent (%). Y-axis 302 illustrates 0% at the graph origin and extends up to 100%. A grid line voltage of 0% is indicative of zero voltage on bus 242 (shown in FIG. 2). A grid line voltage of 100% indicates a voltage on bus 242 that is 100% of the nominal pre-determined voltage associated with system 200. Graph 300 also includes an abscissa (x-axis) 304 that represents time in seconds (s). A zero voltage transient is illustrated to start at time equals 0 seconds. In the exemplary embodiment, the zero voltage condition on bus 242 is 0.15 seconds wherein the voltage on bus 242 fully recovers to 100% at approximately 3.5 seconds after the initiation of the transient. Alternatively, a length of time of the zero voltage condition and the characteristics of a grid voltage recovery depend upon a variety of factors known in the art.

When the voltage decreases to zero as illustrated in FIG. 3, it is likely that there are faults that prevent wind turbine generator 100 from transmitting electrical power to the grid. In the event that the wind continues to rotate rotor 106 (shown in FIGS. 1 and 2), wind turbine generator 100 continues to generate energy that is not converted to electrical energy. Instead, the energy accelerates rotor 106 until a trip feature is initiated that includes, but is not limited to, a manual trip or an automated overspeed trip.

Moreover, generally, power converter assembly 210 and generator 118 (both shown in FIG. 2) are susceptible to grid voltage fluctuations. Generator 118 may store magnetic energy that can be converted to high currents when a generator terminal voltage decreases quickly. Those currents can mitigate life expectancies of components of assembly 210 that may include, but not be limited to, semiconductor devices such as the IGBTs within converters 220 and 222 (both shown in FIG. 2).

Figure 4:
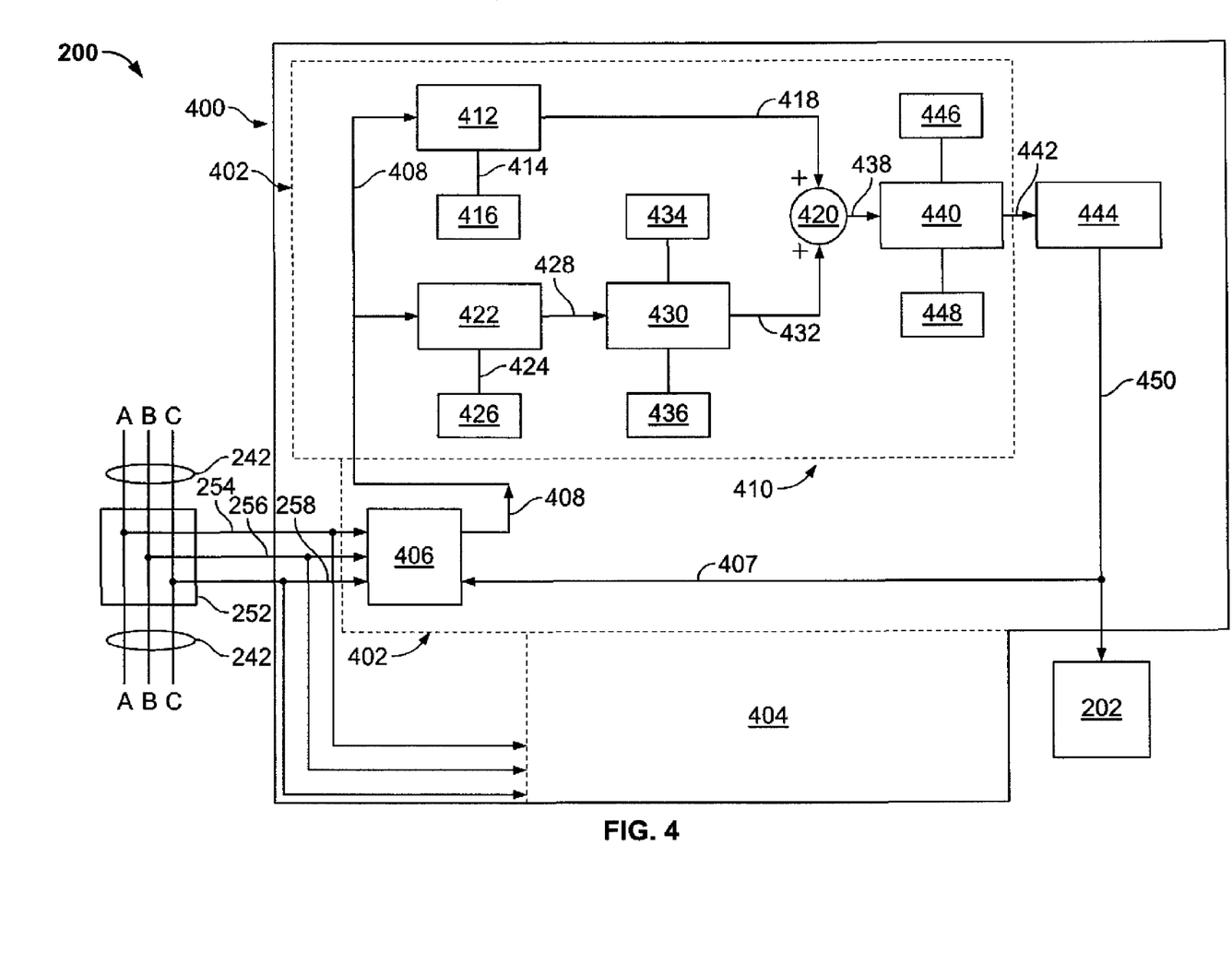
FIG. 4 is a block diagram view of an exemplary phase-locked loop (PLL) regulator that may be used with the electrical and control system shown in FIG. 2.

FIG. 4 is a block diagram view of exemplary phase-locked loop (PLL) regulator 400 that may be used with electrical and control system 200. PLL regulator 400 is configured to facilitate a zero voltage ride through (ZVRT) capability for wind turbine generator 100 such that a potential for a wind turbine generator trip and associated consequences to the semiconductor devices are mitigated during zero voltage transients such as that illustrated in FIG. 3. ZVRT is contrasted to low voltage ride through (LVRT) features known in the art that facilitate mitigating wind turbine generator 100 trips during transients wherein the voltage amplitude rapidly decreases, yet does not decrease to zero volts.

PLL regulator 400 is coupled in electronic data communication with plurality of voltage transducers 252 via electrical conduits 254, 256, and 258 for phases A, B and C of grid bus 242. In the exemplary embodiment, conduits 254, 256 and 258 are electrical cables. Alternatively, a network of transmitters and receivers operating in a pre-determined portion of a radio frequency (RF) band may be used to define conduits 254, 256 and 258. Sinusoidal voltage measurement signals are transmitted from voltage transducers 252 through conduits 254, 256, and 258 for each of the three phases A, B and C, respectively.

In the exemplary embodiment, PLL regulator 400 is configured as a plurality of function blocks within a processor (not shown in FIG. 4). For clarity, PLL regulator 400 is illustrated external to controller 202. Alternatively, PLL regulator 400 is configured within a processor associated with controller 202.

PLL regulator 400 includes at least one phase-locked loop (PLL) 402. Typically, a PLL is a closed-loop feedback scheme that maintains signals generated by the PLL in a fixed phase relationship with a reference signal. The PLL-generated signal is constantly adjusted to match, in phase, the frequency of the reference signal, i.e., the PLL "locks on" to the reference signal. In the exemplary embodiment, PLL 402 locks on to the frequency of bus 242. PLL regulator 400 also includes at least one PLL state machine 404 which is described in further detail below.

PLL 402 includes a phase detector function block 406 that is configured to receive the sinusoidal voltage measurement signals transmitted from conduits 254, 256 and 258 for A-phase, B-phase and C-phase of grid bus 242, respectively. Function block 406 is also configured to receive a phase angle feedback signal 407 and subsequently combines the voltage measurement signals with signal 407 to a generate phase error signal 408. Signal 408 is typically measured in radians (r).

PLL 402 also includes a proportional-integral (PI) filter 410. PI filter 410 includes a proportional gain function block 412. Function block 412 is configured to receive signal 408. Function block 412 is also configured to receive a proportional gain constant signal 414 from a proportional gain constant register 416. Register 416 is populated with values determined as a function of a PLL state (or, PLL mode) as determined by PLL state machine 404 described below. Function block 412 is further configured to multiply signal 408 by signal 414 to generate a proportional gain signal 418 and to transmit signal 418 to a summation function block 420. Signal 418 is typically measured in r/s.

PI filter 410 also includes an integral gain function block 422. Function block 422 is configured to receive signal 408. Function block 422 is also configured to receive an integral gain constant signal 424 from an integral gain constant register 426. Register 426 is populated with values determined as a function of a PLL state (or, PLL mode) as determined by PLL state machine 404 described below. Function block 422 is further configured to integrate signal 408 with respect to time and multiply the integral value by signal 424 to generate and transmit an integral gain signal 428 to a clamping function block 430. Signal 428 is typically measured in r/s. Function block 430 is a filter mechanism that permits a clamped integral gain signal 432 to transmit to summation function block 420 if signal 428 resides between a high limit and a low limit. Signal 432 is typically measured in r/s. In contrast, if signal 428 resides outside of a range defined by the high and low limits, signal 428 is blocked from further transmission. The high and low limits of function block 430 are transmitted to and populated within a high limit register 434 and a low limit register 436, respectively, with values determined as a function of a PLL state (or, PLL mode) as determined by PLL state machine 404 described below.

Function block 420 sums signals 418 and 432 to generate a PI signal 438 and transmit signal 438 to a clamping function block 440. Signal 438 is typically measured in r/s. Function block 440 is a filter mechanism that permits a clamped integral gain signal 442 to transmit to an integrating function block 444 if signal 438 resides between a high limit and a low limit. Signal 442 is typically measured in r/s. In contrast, if signal 438 resides outside of the range defined by the high and low limits, signal 438 is blocked from further transmission. The high and low limits of function block 440 are transmitted to and populated within a high limit register 446 and a low limit register 448 with values determined as a function of a PLL state (or, PLL mode) as determined by PLL state machine 404 described below.

Integrating function block 444 is configured to receive signal 442 and to integrate signal 444 with respect to time. Function block 444 generates a PLL phase angle signal 450 that is transmitted to controller 202 for control of assembly 210 for subsequent control of electrical currents injected into bus 216 (both shown in FIG. 2). Feedback signal 407 is identical to signal 450 and is transmitted to function block 406 as described above. Signals 450 and 407 are typically measured in radians (r).

The grid voltage measurement signals are also transmitted to PLL state machine 404 from transducers 252 to be used as described below.

A method for operating generator 118 is provided. The method includes coupling generator 118 to the grid such that the grid is configured to transmit at least one phase of electric power to and from generator 118. The method also includes configuring generator 118 such that the generator 118 remains electrically connected to the electric power system during and subsequent to a voltage amplitude of the electric power system operating outside of a predetermined range for an undetermined period of time. Specifically, such method includes configuring generator 118 such that generator 118 remains electrically connected to the grid during and subsequent to a voltage amplitude of the electric power decreasing to approximately zero volts for a predetermined period of time, thereby facilitating zero voltage ride through (ZVRT). Moreover, facilitating generator 118 to remain electrically connected to the grid during a ZVRT event subsequently facilitates generator 118 continuing to operate thereby supporting the grid during the transient.

Figure 5:
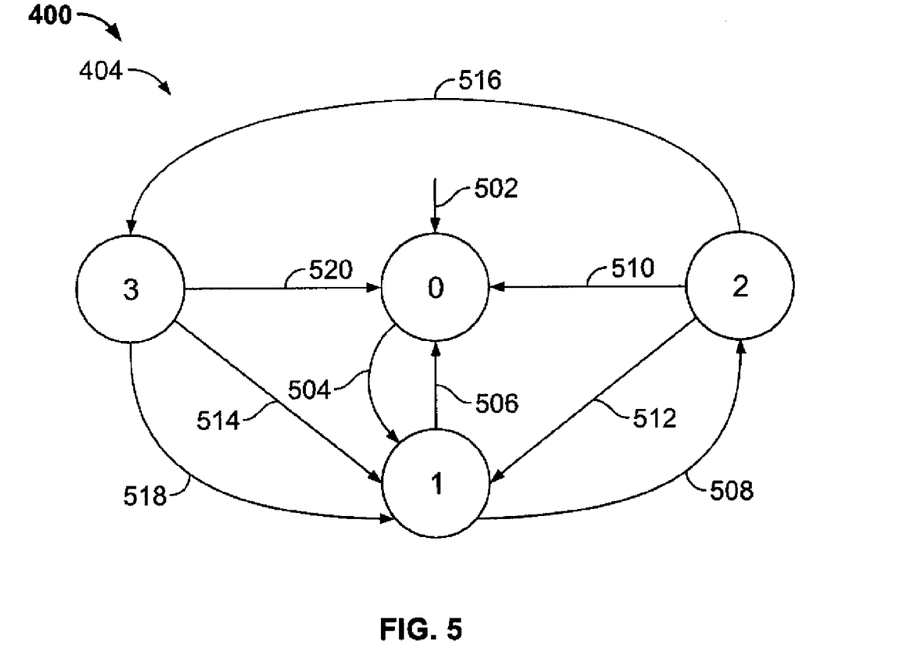
FIG. 5 is a block diagram view of an exemplary PLL state machine that may be used with the PLL regulator shown in FIG. 4.

Specifically, FIG. 5 is a block diagram view of exemplary PLL state machine 404 that may be used with PLL regulator 400 (shown in FIG. 4). In the exemplary embodiment, state machine 404 is configured to transfer PLL regulator 400 to at least one of four states, or modes, of operation as a function of characteristics of voltage signals received as described above. Alternatively, PLL state machine 404 and PLL regulator 400 includes any number of states that facilitates operation of wind turbine 100 as described herein. Each change of state of operation facilitates a dynamic switching between aggressive and non-aggressive gain constants and non-restrictive and restrictive clamps contained within registers 416, 426, 434, 436, 446 and 448 (all shown in FIG. 4). Such switching may be configured to be sliding in nature, discrete in nature, or some combination thereof. Therefore, the plurality of states of operation facilitate zero voltage ride through (ZVRT) as well as other grid faults while also facilitating normal operation. These features facilitate managing such gains and clamps dynamically as a function of the voltage characteristics of the grid to which PLL 402 (shown in FIG. 4) is attempting to lock on to and/or stay locked on to.

State machine 404 is configured to receive the grid voltage measurement signals transmitted to PLL regulator 400 from transducers 252 via conduits 254, 256 and 258 (all shown in FIG. 4). State machine 404 is further configured to receive a "power up" input signal 502 upon successful powering up of PLL regulator 400. Receipt of input signal 502 initiates state machine 404 shifting to state 0. State 0 is characterized by state machine 404 preconditioning a set of values to be inserted into registers 416, 426, 434, 436, 446 and 448.

Figure 6:
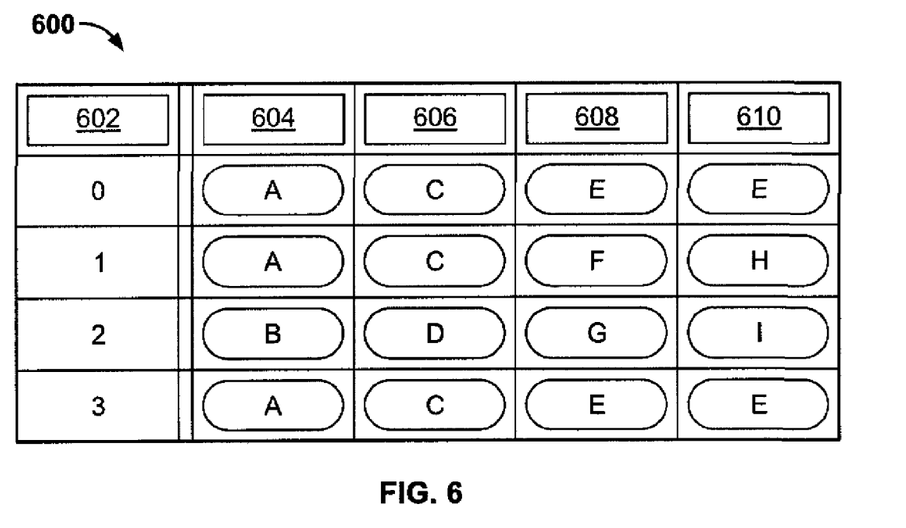
FIG. 6 is a tabular view of a plurality of exemplary gain constant and frequency limit values generated as a function of PLL state as determined by the PLL state machine shown in FIG. 5.

FIG. 6 is a tabular view of a plurality of exemplary gain and frequency limit values 600 generated as a function of PLL state as determined by PLL state machine 404 (shown in FIG. 5). Column 602 represents a plurality of rows 0, 1, 2 and 3 that each correspond to a state of operation of PLL regulator 400 (shown in FIG. 5). PLL regulator 400 may be in only one state of operation at any one time. Column 604 represents a plurality of gain constant values that may be stored in register 416 (shown in FIG. 4). Column 606 represents a plurality of gain constant values that may be stored in register 426 (shown in FIG. 4). Column 606 represents a plurality of minimum frequency limit values that may be stored in registers 436 and 448. Column 608 represents a plurality of maximum frequency limit values that may be stored in registers 434 and 446. For example, when PLL regulator 400 is in state 0 gain values A and C are in registers 416 and 426, respectively. In the exemplary embodiment, values A and C represent differing numerical values, for example, but not being limited to, 2.46737 and 328.039, respectively. Moreover, in state 0, value E is in registers 436, 448, 434, and 446. In the exemplary embodiment, value E represents a numerical value, for example, but not being limited to, 376.99. Alternatively, differing numerical values that facilitate operation of system 200 as described herein may be in registers 436, 448, 434, and 446.

Referring to FIG. 5, in the exemplary embodiment, after a pre-determined period of time (normally a few seconds), state machine 404 attains a permissive to shift regulator 400 to state 1. Upon successful synchronization of wind turbine generator 100 to the grid, as determined by a closing of circuit breaker 238 for example, state machine 404 shifts regulator 400 to state 1 via a transition path 504. Alternatively, any conditions that facilitate operation of system 200 as described herein may be used. Moreover, upon de-synchronization of wind turbine generator 100 from the grid, as determined for example by an opening of circuit breaker 238, state machine 404 shifts regulator 400 to state 0 from state 1 via transition path 506.

Referring to FIG. 6, when PLL regulator 400 is in state 1 gain values A and C are in registers 416 and 426, respectively. In the exemplary embodiment, values A and C represent differing numerical values, for example, but not being limited to, 2.46737 and 328.039, respectively. Moreover, in state 1, value F is in registers 436 and 448, and value H is in registers 434 and 446. In the exemplary embodiment, values F and H represents differing numerical values, for example, but not being limited to, −1507.96 and 1884.96, respectively. Alternatively, differing numerical values that facilitate operation of system 200 as described herein may be in registers 436, 448, 434, and 446. Values A and C are sometimes referred to as "hot" values and values F and H are sometimes referred to as "wide" values. Such values facilitate PLL 402 initially locking on to the grid frequency.

Referring to FIG. 5, in the exemplary embodiment, after a pre-determined period of time after PLL 402 locks on to the grid frequency, state machine 404 shifts regulator 400 to state 2 via a transition path 508. Alternatively, any conditions that facilitate operation of system 200 as described herein may be used. Upon de-synchronization of wind turbine generator 100 from the grid, as determined for example by an opening of circuit breaker 238, state machine 404 shifts regulator 400 to state 0 from state 2 via transition path 510.

Referring to FIG. 6, when PLL regulator 400 is in state 2 gain values B and D are in registers 416 and 426, respectively. In the exemplary embodiment, values B and D represent differing numerical values, for example, but not being limited to, 0.039937 and 0.393601, respectively. Moreover, in state 2, value G is in registers 436 and 448, and value I is in registers 434 and 446. In the exemplary embodiment, values G and I represent differing numerical values, for example, but not being limited to, 94.2478 and 502.529, respectively. Alternatively, differing numerical values that facilitate operation of system 200 as described herein may be in registers 436, 448, 434, and 446. Values B and D are sometimes referred to as "cool" values and values G and I are sometimes referred to as "narrow" values. Such values facilitate PLL 402 adjusting to frequency transients on the grid more slowly than in state 1. This feature facilitates a sluggish reaction of system 200 to normal, minor fluctuations of grid voltage conditions. Moreover, such values facilitate a state shift for more sever grid disturbances as discussed further below. Under normal circumstances, a majority of the time that wind turbine generator 100 is synchronized to the grid, regulator 400 is in state 2.

Referring to FIG. 5, in the exemplary embodiment, in the event of a non-synchronous grid fault, abnormally low (not zero) and/or high grid voltage amplitudes, and/or PLL phase error signal 450 (shown in FIG. 4) exceeds a predetermined threshold, state machine 404 shifts regulator 400 to state 1 from state 2 via a transition path 512. Alternatively, any conditions that facilitate operation of system 200 as described herein may be used. While in state 1, the appropriate gain and clamp values are in the appropriate registers as described above. Upon restoration of the grid voltage to per-determined values, after a pre-determined period of time after PLL 402 locks on to the grid frequency, and PLL error signal 450 remains under a pre-determined threshold for a pre-determined period of time, state machine 404 shifts regulator 400 to state 2 from state 1 via transition path 508. While in state 2, the appropriate gain and clamp values are in the appropriate registers as described above and LVRT is facilitated.

While regulator 400 is in state 1, a shift to a state 3 may occur via transition path 514. Similarly, while regulator 400 is in state 2, a shift to state 3 from state 2 via transition path 516 may occur. In the exemplary embodiment, the pre-requisites to shift from states 1 and 2 to state 3 includes a grid voltage disturbance that is associated with a symmetric fault that decreases grid voltage to zero volts. Referring to FIG. 6, when PLL regulator 400 is in state 3 gain values A and C are in registers 416 and 426, respectively. In the exemplary embodiment, values A and C represent differing numerical values, for example, but not being limited to, 2.46737 and 328.039, respectively. Moreover, in state 3, value E is in registers 436, 448, 434, and 446. In the exemplary embodiment, value E represents a numerical value, for example, but not being limited to, 376.99. Alternatively, differing numerical values that facilitate operation of system 200 as described herein may be in registers 436, 448, 434, and 446. These values facilitate PLL phase angle signal 450 being driven to a phase angle value that would be in effect if there was no grid disturbance. This further facilitates PLL 402 being driven to oscillate at a pre-determined frequency that is substantially similar to the nominal operating frequency, for example, but not being limited to, 60 Hz. Under these circumstances, a potential for wind turbine generator trip is mitigated and ZVRT is facilitated.

Referring to FIG. 5, upon restoration of grid voltage, regulator 400 shifts from state 3 to state 1 via transition path 518. Alternatively, any conditions that facilitate operation of system 200 as described herein may be used. While in state 1, the appropriate gain and clamp values are in the appropriate registers as described above. Upon restoration of the grid voltage to per-determined values, after a pre-determined period of time after PLL 402 locks on to the grid frequency, and PLL error signal 450 remains under a pre-determined threshold for a pre-determined period of time, state machine 404 shifts regulator 400 to state 2 from state 1 via transition path 508. While in state 2, the appropriate gain and clamp values are in the appropriate registers as described above. Shifting from state 3 to state 1 and then state 2 facilitates effecting smooth state shifting. Upon de-synchronization of wind turbine generator 100 from the grid, as determined for example by an opening of circuit breaker 238, state machine 404 shifts regulator 400 to state 0 from state 3 via transition path 520.

The method and apparatus for a wind turbine generator control system described herein facilitate operation of a wind turbine generator. More specifically, the wind turbine generator electrical and control system as described above facilitates an efficient and effective electrical generation and mechanical load transfer scheme. Also, the robust, electrical and control system facilitates generator production efficiency and effectiveness. Such control system also facilitates wind turbine generator reliability and wind turbine generator outages by reducing the number of trips due to grid disturbances.

Exemplary embodiments of wind turbine electrical and control systems as associated with wind turbine generators are described above in detail. The methods, apparatus and systems are not limited to the specific embodiments described herein nor to the specific illustrated wind turbine generators.

While the invention has been described in terms of various specific embodiments, those skilled in the art will recognize that the invention can be practiced with modification within the spirit and scope of the claims.

What is claimed is:

1. A method for operating an electrical machine, said method comprising:
    coupling the electrical machine to an electric power system such that the electric power system is configured to transmit at least one phase of electric power to the electrical machine; and
    configuring the electrical machine such that the electrical machine remains electrically connected to the electric power system during and subsequent to a voltage amplitude of the electric power system operating outside of a predetermined range for an undetermined period of time, said configuring the electrical machine comprising:
        electrically coupling at least a portion of a control system to at least a portion of the electric power system;
        coupling the control system in electronic data communication with at least a portion of the electrical machine; and
        configuring the electrical machine and the control system such that the electrical machine remains electrically connected to the electric power system during and subsequent to the voltage amplitude of the electric power system decreasing below the predetermined range including approximately zero volts for the undetermined period of time, thereby facilitating zero voltage ride through (ZRVT).

2. A method in accordance with claim 1 wherein coupling the control system in electronic data communication with at least a portion of the electrical machine comprises:
    providing a phase-locked loop (PLL) regulator within the control system that has a PLL in electronic data communication with a PLL state machine;
    measuring a voltage of the electric power in the electric power system;
    generating a voltage measurement signal and a frequency measurement signal;
    transmitting the voltage measurement signal to the PLL state machine;
    transmitting the frequency measurement signal to the PLL;
    determining a PLL regulator state;
    using at least one algorithm within the PLL to generate at least one electrical machine control signal;
    coupling a power conversion assembly to at least a portion of the control system and to at least a portion of the electrical machine;
    coupling the control system to at least a portion of the power conversion assembly; and
    configuring at least a portion of the control system to mitigate channeling electrical power through the power conversion assembly.

3. A method in accordance with claim 2 wherein determining a PLL regulator state comprises the PLL state machine:
    receiving the voltage measurement signal;
    using at least one algorithm to determine an amplitude of the voltage measurement signal; and
    using at least one algorithm to select a PLL regulator state as a function of the amplitude of the voltage measurement signal.

4. A method in accordance with claim 2 wherein using at least one algorithm within the PLL to generate at least one electrical machine control signal comprises:
    selecting at least one gain constant numerical value and at least one limit numerical value from a plurality of gain constant numerical values and a plurality of limit numerical values as a function of the PLL regulator state; and
    applying the selected gain constant numerical value and the selected limit numerical value to the at least one algorithm.

5. A method in accordance with claim 4 wherein selecting at least one gain constant numerical value and at least one limit numerical value comprises selecting at least one maximum limit numerical value and at least one minimum limit numerical value further comprising selecting a range extending between the maximum and minimum limit numerical values as a function of the PLL regulator state.

6. A method in accordance with claim 5 wherein applying the selected gain constant numerical value and the selected limit numerical value to the at least one algorithm comprises:
    selecting a first gain constant numerical value and a first range extending between the maximum and minimum limit numerical values for a first PLL regulator state, the first PLL regulator state is indicative of at least one of the PLL not being locked on to the electric power system frequency signal and at least one electric power system voltage amplitude is outside a pre-determined range of values; and
    selecting a second gain constant numerical value and a second range extending between the maximum and minimum limit numerical values for a second PLL regulator state, wherein the second gain constant numerical value is less than the first gain constant numerical value, the second range is less than the first range, and the second PLL regulator state is indicative of the PLL being locked on to the electric power system frequency signal.

7. A control system for an electrical machine, the electrical machine configured to be electrically coupled to an electric power system, wherein the electric power system is configured to transmit at least one phase of electric power to the electrical machine, said control system facilitates the electrical machine remaining electrically connected to the electric power system during and subsequent to at least one of:
- at least one voltage amplitude of the electric power system operating outside of a predetermined range for an undetermined period of time; and
- a voltage amplitude of each phase of the electric power system decreasing to approximately zero volts for a predetermined period of time, thereby facilitating zero voltage ride through (ZVRT).

8. A control system in accordance with claim 7 comprising at least one algorithm configured to adjust at least one of the following as a function of at least one voltage amplitude of the electric power system:
- at least one gain constant numerical value;
- at least one maximum limit numerical value; and
- at least one minimum limit numerical value.

9. A control system for an electrical machine, the electrical machine configured to be electrically coupled to an electric power system, wherein the electric power system is configured to transmit at least one phase of electric power to the electrical machine, said control system facilitates the electrical machine remaining electrically connected to the electric power system during and subsequent to at least one voltage amplitude of the electric power system operating outside of a predetermined range for an undetermined period of time, said control system comprising at least one phase-locked loop (PLL) regulator coupled in electronic data communication with at least a portion of the electric power system, said PLL regulator comprising:
- at least one PLL comprising at least one phase detection scheme and at least one proportional-integral (PI) filter scheme; and
- at least one PLL state machine coupled in electronic data communication with at least a portion of said PLL.

10. A control system in accordance with claim 9 wherein said PI filter scheme comprises:
- at least one proportional gain algorithm configured to receive at least one proportional gain constant selected from a plurality of proportional gain constants as a function of at least one voltage amplitude of the electric power system, said proportional gain algorithm further configured to generate a proportional gain signal;
- at least one integral gain algorithm configured to receive at least one integral gain constant selected from a plurality of integral gain constants as a function of at least one voltage amplitude of the electric power system, said integral gain algorithm further configured to generate an integral gain signal;
- at least one integral filter algorithm configured to receive at least one integral filter limit selected from a plurality of integral filter limits as a function of at least one voltage amplitude of the electric power system, said integral filter algorithm further configured to generate a filtered integral signal;
- at least one summation algorithm configured to receive and sum said proportional gain and filtered integral signals and generate a summation signal; and
- at least one summation filter algorithm configured to receive at least one summation filter limit selected from a plurality of summation filter limits as a function of at least one voltage amplitude of the electric power system.

11. A control system in accordance with claim 10 wherein said PLL state machine comprises at least one algorithm configured to determine a state of said PLL regulator as a function of at least one voltage amplitude of the electric power system and at least one table of numerical values comprising at least:
- said plurality of proportional gain constants;
- said plurality of integral gain constants;
- said plurality of integral filter limits; and
- said plurality of summation filter limits.

12. A control system in accordance with claim 10 wherein said PLL state machine is configured to transmit at least one of the following as a function of said PLL regulator state:
- said proportional gain constant selected from said plurality of proportional gain constants;
- said integral gain constant selected from said plurality of integral gain constants;
- said integral filter limit selected from said plurality of integral filter limits; and
- said summation filter limit selected from said plurality of summation filter limits.

13. A wind turbine comprising:
- at least one electric power generator configured to be electrically coupled to an electric power system, wherein the electric power system is configured to transmit at least one phase of electric power to and from said generator;
- at least one control system configured to be electrically coupled to the electric power system, said control system facilitates the electrical machine remaining electrically connected to the electric power system during and subsequent to at least one voltage amplitude of the electric power system operating outside of a predetermined range for an undetermined period of time; and
- at least one phase-locked loop (PLL) regulator coupled in electronic data communication with at least a portion of the electric power system, said PLL regulator comprising:
  - at least one PLL comprising at least one phase detection scheme and at least one proportional-integral (PI) filter scheme; and
  - at least one PLL state machine coupled in electronic data communication with at least a portion of said PLL.

14. A wind turbine in accordance with claim 13 comprising at least one algorithm configured to adjust at least one of the following as a function of at least one voltage amplitude of the electric power system:
- at least one gain constant numerical value;
- at least one maximum limit numerical value; and
- at least one minimum limit numerical value.

15. A wind turbine in accordance with claim 13 wherein said PI filter scheme comprises:
- at least one proportional gain algorithm configured to receive at least one proportional gain constant selected from a plurality of proportional gain constants as a function of at least one voltage amplitude of the electric power system, said proportional gain algorithm further configured to generate a proportional gain signal;
- at least one integral gain algorithm configured to receive at least one integral gain constant selected from a plurality of integral gain constants as a function of at least one voltage amplitude of the electric power system, said integral gain algorithm further configured to generate an integral gain signal;
- at least one integral filter algorithm configured to receive at least one integral filter limit selected from a plurality of integral filter limits as a function of at least one voltage amplitude of the electric power system, said integral filter algorithm further configured to generate a filtered integral signal;

at least one summation algorithm configured to receive and sum said proportional gain and filtered integral signals and generate a summation signal; and at least one summation filter algorithm configured to receive at least one summation filter limit selected from a plurality of summation filter limits as a function of at least one voltage amplitude of the electric power system.

16. A wind turbine in accordance with claim 15 wherein said PLL state machine comprises at least one algorithm configured to determine a state of said PLL regulator as a function of at least one voltage amplitude of the electric power system and at least one table of numerical values comprising at least:

said plurality of proportional gain constants;
said plurality of integral gain constants;
said plurality of integral filter limits; and
said plurality of summation filter limits.

17. A wind turbine in accordance with claim 15 wherein said PLL state machine is configured to transmit at least one of the following as a function of said PLL regulator state:

said proportional gain constant selected from said plurality of proportional gain constants;

said integral gain constant selected from said plurality of integral gain constants;

said integral filter limit selected from said plurality of integral filter limits; and said summation filter limit selected from said plurality of summation filter limits.

* * * * *

(12) EX PARTE REEXAMINATION CERTIFICATE (9745th)
United States Patent
Barker et al.

(10) Number: US 7,629,705 C1
(45) Certificate Issued: Jul. 12, 2013

(54) METHOD AND APPARATUS FOR OPERATING ELECTRICAL MACHINES

(75) Inventors: Sidney A. Barker, Troutville, VA (US);
Anthony Klodowski, Hardy, VA (US);
John D'Atre, Vancouver, WA (US);
Elnar Larsen, Charlton, NY (US);
Goran Drobnjak, Niskayuna, NY (US)

(73) Assignee: General Electric Company, Schenectady, NY (US)

Reexamination Request:
No. 90/012,587, Sep. 14, 2012

Reexamination Certificate for:
Patent No.: 7,629,705
Issued: Dec. 8, 2009
Appl. No.: 11/551,430
Filed: Oct. 20, 2006

(51) Int. Cl.
*F03D 9/00* (2006.01)
*H02P 9/04* (2006.01)
*H02P 11/00* (2006.01)
*H02H 7/06* (2006.01)

(52) U.S. Cl.
USPC .................. 290/55; 322/24; 322/28

(58) Field of Classification Search
None
See application file for complete search history.

(56) References Cited

To view the complete listing of prior art documents cited during the proceeding for Reexamination Control Number 90/012,587, please refer to the USPTO's public Patent Application Information Retrieval (PAIR) system under the Display References tab.

*Primary Examiner* — Robert Nasser (57) ABSTRACT

A method for operating an electrical machine includes coupling the electrical machine to an electric power system such that the electric power system is configured to transmit at least one phase of electric power to and from the electrical machine. The method also includes configuring the electrical machine such that the electrical machine remains electrically connected to the electric power system during and subsequent to a voltage amplitude of the electric power system operating outside of a predetermined range for an undetermined period of time.

At the time of issuance and publication of this certificate, the patent remains subject to pending reexamination control number 95/000,633 filed May 24, 2011. The claim content of the patent may be subsequently revised if a reexamination certificate issues from the reexamination proceeding.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

Claims 2-17 were not reexamined.

\* \* \* \* \*

US007629705C2

(12) EX PARTE REEXAMINATION CERTIFICATE (10130th)
United States Patent
Barker et al.

(10) Number: US 7,629,705 C2
(45) Certificate Issued: Apr. 24, 2014

(54) METHOD AND APPARATUS FOR OPERATING ELECTRICAL MACHINES (75) Inventors: Sidney A. Barker, Troutville, VA (US); Anthony Klodowski, Hardy, VA (US); John D'Atre, Vancouver, WA (US); Einar Larsen, Charlton, NY (US); Goran Drobnjak, Niskayuna, NY (US)

(73) Assignee: General Electric Company, Schenectady, NY (US)

Reexamination Request:
No. 90/012,880, May 24, 2013

Reexamination Certificate for:
Patent No.: 7,629,705
Issued: Dec. 8, 2009
Appl. No.: 11/551,430
Filed: Oct. 20, 2006

Reexamination Certificate C1 7,629,705 issued Jul. 12, 2013

(51) Int. Cl.
*F03D 9/00* (2006.01)
*H02P 9/04* (2006.01)
*H02P 11/00* (2006.01)
*H02H 7/06* (2006.01)

(52) U.S. Cl.
USPC .................................. 290/55; 322/24; 322/28

(58) Field of Classification Search
None
See application file for complete search history.

(56) References Cited

To view the complete listing of prior art documents cited during the proceeding for Reexamination Control Number 90/012,880, please refer to the USPTO's public Patent Application Information Retrieval (PAIR) system under the Display References tab.

*Primary Examiner* — Robert Nasser (57) ABSTRACT

A method for operating an electrical machine includes coupling the electrical machine to an electric power system such that the electric power system is configured to transmit at least one phase of electric power to and from the electrical machine. The method also includes configuring the electrical machine such that the electrical machine remains electrically connected to the electric power system during and subsequent to a voltage amplitude of the electric power system operating outside of a predetermined range for an undetermined period of time.

At the time of issuance and publication of this certificate, the patent remains subject to pending reexamination control number 95/000,633 filed May 24, 2011. The claim content of the patent may be subsequently revised if a reexamination certificate issues from the reexamination proceeding.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

Claims 2-17 were not reexamined.

\* \* \* \* \*